United States Patent [19]

Grossi et al.

[11] Patent Number: 4,772,647

[45] Date of Patent: Sep. 20, 1988

[54] ASPHALT RUBBER EMULSIONS

[75] Inventors: Anthony V. Grossi; G. Fred Willard, both of Newark, Ohio

[73] Assignee: Owens-Corning Fiberglas Corp., Toledo, Ohio

[21] Appl. No.: 122,490

[22] Filed: Oct. 26, 1987

Related U.S. Application Data

[63] Continuation of Ser. No. 839,482, Mar. 14, 1986, abandoned.

[51] Int. Cl.$^4$ ............................................. C38L 95/00
[52] U.S. Cl. .................................. 324/60; 252/311.5; 524/68; 524/69
[58] Field of Search ........................ 524/60, 68, 69; 252/311.5

[56] References Cited

U.S. PATENT DOCUMENTS

| | | | |
|---|---|---|---|
| 4,196,115 | 4/1980 | Bresson | 524/68 |
| 4,316,829 | 2/1982 | Roberts | 260/28.5 |
| 4,393,155 | 7/1983 | Garrett, Jr. | 524/69 |
| 4,394,481 | 7/1983 | Grossi et al. | 525/54.5 |
| 4,415,717 | 11/1983 | Nieh | 524/555 |
| 4,419,489 | 12/1983 | Grossi et al. | 525/54.5 |
| 4,423,088 | 12/1983 | Graf et al. | 427/138 |
| 4,456,633 | 6/1984 | Grossi et al. | 427/138 |
| 4,507,365 | 3/1985 | Lower et al. | 428/489 |
| 4,523,957 | 6/1985 | Graf et al. | 106/277 |
| 4,530,652 | 7/1985 | Buck et al. | 524/68 |
| 4,654,385 | 3/1987 | Roberts et al. | 524/69 |

OTHER PUBLICATIONS

Brochure of American Cyanamid Co., Wayne, NJ, No. 5-1237 5m, 7/75 "Cyanamer Polyacrylamides".
"Cyanamer P-250 Sales Specifications", American Cyanamid Co., undated.

*Primary Examiner*—Allan M. Lieberman
*Attorney, Agent, or Firm*—Patrick P. Pacella; Robert F. Rywalski

[57] ABSTRACT

An aqueous asphaltic emulsion wherein the asphaltic component is either a chemically-modified asphalt or an asphalt-elastomer blend, and the aqueous component contains water, a surfactant, and a high molecular weight, non-ionic, homopolymer of acrylamide. The emulsions find use as crack fillers for concrete or asphaltic roads and the like, or as coating compositions which can be sprayed on a building wall or the like as a waterproofing coating. The incorporation of the acrylamide ingredient into the composition ensures rapid and complete curing of other types of emulsions, and the emulsions possess physical properties and low-temperature flex properties which closely approximate those of the original asphaltic component.

8 Claims, No Drawings

ASPHALT RUBBER EMULSIONS

This is a continuation of co-pending application Ser. No. 839,482, filed on Mar. 14, 1986, now abandoned.

TECHNICAL FIELD

The present invention relates to aqueous asphaltic emulsions wherein the asphaltic component is either a chemically modified asphalt or an asphalt-elastomer blend, and the aqueous component contains an acrylamide as an additive. Either type of emulsion can be utilized as a coating composition, i.e., as a basement waterproofing spray, or as a crack filler for highway and related uses. The acrylamide ingredient greatly improves the curing of either type of emulsion, and ensures that the final emulsion-derived film has physical properties and low-temperature flex properties closely resembling those of the original asphaltic component.

BACKGROUND AND SUMMARY OF THE INVENTION

U.S. Pat. No. 4,394,481 is incorporated herein by reference. This patent discloses a chemically modified asphalt (CMA) which is produced by the long-time reaction, under reflux, of an asphalt, a vinyl aromatic monomer, a rubbery polymer and an acrylamide. Such chemically modified asphalts are disclosed for use as protective coatings for various substrates and are applied, for example, to a cementitious substrate from a solvent carrier, typically a mixture of 80% toluene and 20% normal hexane. U.S. Pat. No. 4,507,365 proposes the use of an environmentally desirable solvent mixture of at least 75% cyclohexane, 15 to 2% toluene, and up to 10% n-hexane for essentially the same CMA.

U.S. Pat. No. 4,456,633 provides a chip seal emulsion of essentially the same CMA in an emulsion which may be cationic, anionic or non-ionic. Such emulsions are intended for use only as an additive for conventional non-chemically modified asphalt emulsions to increase the retention of aggregate, for example, when the combined emulsion is utilized for highway pavement repair. The method of use includes blending the CMA emulsion into the non-CMA emulsion, applying the combination to a pavement, and then applying an aggregate to the applied combination emulsion.

U.S. Pat. No. 4,419,489, also incorporated herein by reference, discloses essentially the same CMA incorporated into an aqueous emulsion of the cationic rapid set type, the final emulsion comprising 60-65% CMA and 35-40% aqueous medium. The emulsion was intended for use as a cold overlay or as a joint sealer for highways or as a water-resistant membrane. This type of emulsion has been used as a waterproofing basement coating.

Prior to the present invention, it has not been possible to form a satisfactory aqueous emulsion of a blend of a synthetic elastomer, e.g., a block copolymer of styrene and butadiene. Even where it has been possible to form an emulsion of an asphalt-radial teleblock copolymer blend, the emulsion cures to a residue film which has physical properties and low temperature flexing characteristics significantly less than the equivalent properties of the asphalt-copolymer blend alone.

These prior art emulsions all incorporate, as a thickener, or as a viscosity control, a cellulose-based additive, such as hydroxyethyl cellulose, in order to obtain the desired final emulsion viscosity, i.e., on the order of 4,000 to 8,000 cps at normal ambient temperatures of about 70° F.

Aqueous asphalt emulsions generally cure by evaporation of a water content, leaving a residual film comprising the asphaltic component, the emulsifier or surfactant, and any viscosity control agent. It has been found that the prior art emulsions containing hydroxyethyl cellulose form a dark surface layer or "skin" upon curing, and this skin materially retards water evaporation from the underlying portions of the emulsion. Consequently, a surface coating of a prior art emulsion on a vertical substrate, such as a basement exterior wall, will "skin over" with the underlying uncured emulsion, if overly thick, running down the wall. Similarly, a crack filler emulsion of the prior art will "skin over" and the underlying, still-liquid, uncured emulsion will "pump out" of the underlying crack when subjected to traffic. As a result, the prior art emulsions necessarily require unduly long cure times, and running or "pumping" remains a problem.

The present invention now provides an aqueous emulsion of either a chemically modified asphalt or a blend of asphalt and an elastomer with an aqueous emulsification medium containing a high molecular weight acrylamide as a viscosity control ingredient. It has been found that such emulsions possess desirable physical properties, good low temperature flexing characteristics, and cure more quickly without "skinning over." Only a minute amount of the acrylamide is required, preferably on the order of from about 0.5 to about 10% of a 2% aqueous solution of the acrylamide. Thus, the final preferred emulsification medium will contain from about 0.01% to about 0.20% of the acrylamide.

While the mechanism of the present invention is not fully understood, the previously used hydroxyethyl cellulose apparently thickened the emulsion by its absorption of water. The water-swollen hydroxyethyl cellulose of the prior art apparently materially disrupted the residue film formed upon curing of the emulsion, while the water entrapped by the hydroxyethyl cellulose simply could not escape through the surface skin formed by the initial evaporation of water from the emulsion surface. The relatively large amount of hydroxyethyl cellulose required (on the order of 5 to 100 times as much as the amount of acrylamide required by the present invention, particularly when swollen by the absorbed water) apparently disrupted the blended asphalt emulsion film and, when present at the surface from which evaporation was taking place, caused the emulsion to "skin over."

In contrast, the acrylamide of this invention is of extremely high molecular weight, and the acrylamide apparently is a true thixotropic agent which serves to gel the emulsion when it rests, while the emulsion acts as a liquid under agitation or pressure, thereby accommodating spraying of the emulsion as a coating or dispensing of the emulsion under pressure as a crack filler. Finally, the extremely small amount of the acrylamide used does not interfere with the emulsion, so that the emulsion is stable, and the minute amount of acrylamide does not disrupt the final residue film, so that the emulsion film properties approximate the film properties of the original asphaltic component.

DETAILED DESCRIPTION OF THE PRESENT INVENTION AND INDUSTRIAL EXPLOITATION

The aqueous emulsions of the present invention are of two general types, depending primarily upon the asphaltic component of the emulsion.

The CMA Component

A first type of emulsion of this invention is one in which the asphalic component is a chemically modified asphalt of the type generally described in U.S. Pat. No. 4,419,489. Generally, the chemically modified asphalt or "CMA" is prepared by reacting an asphalt, a vinyl monomer, one or more elastomers, and an acrylamide for an extended period of time, on the order of 20 to 30 hours, at an elevated temperature, on the order of 300° F. to 400° F., under reflux. The materials, amounts of materials, and the reaction conditions are selected to produce a final product having a viscosity on the order of 1200 to about 2500 cps at 285° F., the viscosity preferably ranging from about 1800 to about 2000 cps.

The asphalt employed in the CMA will have a viscosity of less than about 120,000 cps (at 140° F.), and preferably less than about 75,000 cps (at 140° F.). Outstanding materials are produced from asphalt having a viscosity of about 40,000 to about 60,000 cps (at 140° F.) or less. Asphalt materials which are suitable may be selected from those which are typically used for road paving, repair and maintenance purposes. Thus, such asphalt includes natural asphalt, petroleum asphalt and petroleum tar. The natural asphalts include, for example, asphaltite, such as Gilsonite, graphamite and glancepitch, lake asphalt, such as Trinidad asphalt, and rock asphalt. The petroleum asphalt that may be used includes straight asphalt obtained by distillation of a crude oil, blown asphalt, produced by blowing as oxygen-containing gas into straight asphalt, and solvent extracted asphalt. The petroleum tar that may be used includes coal tar and oil gas tar. Tar pitch is equally suitable.

Preferably, the asphalt which will be employed is an asphalt cement of the type generally used for road paving, repair and maintenance purposes. Such asphalts typically have penetrations ranging between about 20 to about 200 with AC-5 paving grade asphalt having a penetration of about 140 to about 150 being especially suitable.

Suitable polymerization vinyl aromatic monomers are disclosed in detail in U.S. Pat. No. 4,419,489. Styrene monomer is preferred.

As the rubber polymer, use can be made of a number of elastomeric materials which are well known to those skilled in the art. Included are natural rubbers as well as synthetic rubbers. Suitable are synthetic rubbers which are homopolymers of a conjugated diene (e.g., butadiene, isoprene, chloroprene, etc.) as well as various polymers which are substituted with a functional group containing a labile hydrogen atom. For example, various hydroxy, amino and like substituted homopolymers of conjugated dienes may likewise be used in the practice of this invention. Substituted butadienes are commercially available from, for example, Atlantic-Richfield under the trademark "Poly B-D," a series of hydroxy-terminated butadiene polymers; for example, use can be made of hydroxy-terminated butadiene homopolymers like Poly B-D R-15M which has a hydroxy number of 42 or Poly B-D R-45M.

Preferably, the rubbery polymer is an elastomeric material formed by copolymerization of one or more of the conjugated dienes described above with one or more ethylenic monomers such as styrene as well as hydroxy, amino and mercapto-substituted derivatives thereof, acrylonitrile, methacrylonitrile, acrylic acid, methacrylic acid, etc. Included are butadiene-styrene rubbers, butadiene-acrylonitrile rubbers, etc. Hydroxy-terminated copolymers are likewise useful in the practice of this invention, including the hydroxy-terminated butadiene-styrene copolymer designated "Poly B-D CS-15" and hydroxy-terminated butadiene-acrylonitrile copolymers like Poly B-D CN-15 having a hydroxyl number of 39.

The utilization in the CMA of block copolymers of at least two monoalkyenyl arene polymer end blocks and at least one elastomeric conjugated diene polymer midblock are preferred as rubbery polymers in the CMA. The number of blocks in the block copolymer is not of special importance, and the molecular configuration can be linear, graft, radial or star depending upon the method by which the block copolymer is formed. Block copolymers having end blocks of styrene and midblocks of butadiene or isoprene are particularly preferred. Such block copolymers are available under the trade names "Finaprene," available from Cosden Oil & Chemical Co. of Dallas, Texas and "Kraton," available from Shell Chemical Company of Houston, Texas. Specifically preferred block copolymers include Finaprene 1205, a linear styrene-butadiene-styrene block copolymer having a butadiene/styrene ratio of 75/25 and a typical molecular weight of 125,000; and Finaprene 416, which is a radial styrene-butadiene block copolymer having a butadiene/styrene ratio of 70/30 and a typical molecular weight of 160,000. Other similar block copolymers are commercially available and are well known to those skilled in the art.

It has been found that mixtures of linear and radial block copolymers are particularly useful in the CMA compositions of the present invention. Such mixtures, when incorporated into the reaction mixture, yield a CMA of the desired viscosity and tack while being relatively easily emulsified into the final emulsion product. Proportions of linear-to-radial copolymers ranging from about 1-to-1 to about 5-to-1 are suitable. A total elastomer content of about 8–10% by weight is preferred, with blends of about 8–10% Finaprene 1205 and about 0–2% Finaprene 416 being most preferred.

The CMA reactive acrylamides employed in the present invention are unpolymerized and have a double bond. Several specific suitable acrylamides are disclosed in detail in U.S. Pat. No. 4,419,489. Desirably, they may be secondary amides or tertiary amides. Preferably, the acrylamide will be a compound of the formula $(R_1)(R_2)C=C(R_3)-C(O)N(R_4)(R_5)$, wherein $R_1$, $R_2$ and $R_3$ are independently selected from hydrogen, or an alkyl containing 1 to 3 carbon atoms; $R_4$ and $R_5$ are independently selected from hydrogen, an alkyl containing 1 to 3 carbon atoms, or preferably a radical of the formula $-R_6-N(R_7(R_8)$, wherein $R_7$ and $R_8$ are independently selected from hydrogen or an alkyl having 1 to 3 carbon atoms, and $R_6$ is an alkylene group containing 1 to 5 carbon atoms. The preferred acrylamide is dimethylaminopropylmethacrylamide (DMAPMA), that is a compound of the formula $CH_2=C(CH_3)C(O)N(H)(CH_2)_3N(CH_3)_2$.

A preferred CMA contains, based on the asphalt content, from about 0.5 weight percent to about 35 weight percent styrene, from about 0.2 weight percent to about 15 weight percent DMAPMA, and from about 0.5 weight percent to about 30% elastomer. A particularly preferred CMA composition contains about 80 weight percent AC-5 asphalt, about 0.5 weight percent DMAPMA, about 9.5 weight percent styrene, about 8% linear styrene-butadiene block copolymer and about 2% radial styrene-butadiene block copolymer.

The Blended Component

A second type of emulsion of the present invention is that wherein the asphaltic component is a blend of asphalt with a block copolymer of butadiene and styrene.

The asphalt in such a blended asphaltic component may be any of the asphalts above described. A preferred asphalt is a flux of relatively low viscosity identified as DT 4105 and DT 4044, each of which has a softening point of about 108° F., a penetration of about 255, a viscosity of about 2050 at 210° F., of about 625 at 245° F., and about 175 at 285° F.

It has been found that a blend of the above-identified asphalt with a radial teleblock copolymer of styrene-butadiene, containing 30% styrene and 70% butadiene and having a nominal molecular weight of about 160,000. Such a radial teleblock copolymer is available as Finaprene 416.

In forming the blends, the asphalt is heated to about 300° to 400° F., and the block copolymer is added to the hot asphalt, using a high speed blender or a high shear mixer to form a smooth blend, and the blending continues for about ½ hour to about 2 hours.

The Aqueous Emulsion Medium

The aqueous emulsion medium which is utilized in emulsifying either the chemically modified asphalt or the asphalt-elastomer blend preferably is water containing from about 0.5 to about 3% by weight of a surfactant, an amount of surfactant ranging from about 1.0 to about 2.5% by weight being preferred. The surfactant can be cationic, anionic or non-ionic, cationic being preferred. The fatty amines, most desirably fatty primary monoamines, are particularly useful. Specifically, Arosurf AA-60 (a modified tallow) can be utilized.

A thickener or thixotropic agent is added to the emulsion medium as a viscosity control and as a aid in drying the emulsion in place after a spray application or after the emulsion has been used as a crack filler. The present invention proposes the utilization of from about 0.25 to about 10 weight percent of a 2% solution of Cyanamer P-250 as a thixotropic agent which is incorporated into the aqueous emulsification medium. Cyanamer P-250 is a polyacrylamide which is a non-ionic homopolymer of acrylamide having a molecular weight of approximately 5 million to 6 million. If desired, the thixotropic agent (P-250) can be added with thorough mixing after the emulsion is formed, rather than being dissolved in the aqueous medium prior to emulsification.

Emulsion Formation

Preferably, the final emulsion is formed in a colloid mill with the molten asphalt and the aqueous emulsification medium being simultaneously added to the mill, the molten asphalt component being at a temperature of from about 250° F. to about 300° F., preferably about 285° F., and the aqueous emulsification medium having been preheated preferably to a temperature of about 100° F.

After the final emulsion is formed, it preferably is cooled in a heat exchanger in order to stabilize the emulsion at a given viscosity. Generally, the lower the temperature of the final emulsion, the lower the ultimate viscosity of the emulsion and the more stable the emulsion upon storage. Preferably, emulsions containing chemically modified asphalt are cooled to a final emulsion delivery temperature of from about 105° to about 125° F., while emulsions containing blends of asphalt and elastomer are preferably delivered at a final emulsion temperature of about 130° to 140° F.

In each instance, the final emulsion will contain from about 30 to about 45%, preferably about 32 to about 40% of the emulsification medium, and from about 55 to about 75% of the asphaltic ingredient, and preferably from about 60 to about 68%. The final emulsion contains from about 55 to about 70% solids.

Preparation of Chemically Modified Asphalt (CMA)

Using a charge of about 80% by weight of AC-5 asphalt, 0.5% by weight of dimethylaminopropylmethacrylamide (DMAPMA), about 9.5% by weight of styrene, and about 10% by weight elastomer consisting of about 8% Solprene 1205C and about 2% by weight Finaprene 416, a composition was produced as follows. Asphalt, at a temperature of about 250° F. to about 310° F. was pumped into a reactor equipped with an agitator and a reflux condenser and followed by the addition of the other reaction materials. The ingredients were then heated at a temperature of about 348° F. for about 24 hours with agitation and under reflux. The reacted material has a viscosity of 1800–2000 cps at 285° F.

EXAMPLE I

Preparation of CMA Control Emulsion

A cationic rapid set (CRS) emulsion of the above chemically modified asphalt was prepared as follows. An aqueous emulsification medium was formulated containing about 1.5% by weight of Arosurf AA-60 emulsifier and about 0.25% by weight of hydroxyethyl cellulose as a stabilizer, the pH being adjusted to about 2.5–3.5 using hydrochloric acid. Using a colloid mill, an emulsion was prepared using about 60% to about 65% (by weight) of the above chemically modified asphalt and about 35% to about 40% of the aqueous emulsification medium. The chemically modified asphalt was supplied to the colloid mill at a temperature of about 285° F. and the aqueous emulsification medium at a temperature of about 100° F. The final emulsion was passed through a heat exchanger and was collected at a final temperature of about 115° F.

EXAMPLE II

Preparation of CMA Emulsion

An emulsion was prepared as in Example I, but replacing the hydroxyethyl cellulose of the aqueous emulsification medium with 1.25 parts of a 2% aqueous solution of Cyanamer P-250.

Preparation of Asphalt-Elastomer Blends

A blend of 9% by weight Finaprene 416 resin, a radial teleblock copolymer of styrene and butadiene containing 30% styrene and 70% butadiene, and 91% asphalt was prepared.

398 pounds of premelted asphalt was charged into a 130-gallon tank heated by a hot oil heater at 350° F. The tank was equipped with a 25-horsepower high shear mixer. 39.8 pounds of the block copolymer in crumb form was added over about 5 minutes. The mixing was maintained at 3450 rpm mixer speed for 1.5 hours with the temperature maintained in a range of about 350° to about 380° F.

EXAMPLE III

Preparation of Control Blend Emulsion

The asphalt-elastomer blend of Example II, using an AC-5 asphalt of penetration grade 140–150, was emulsified in an aqueous emulsification medium of 100 parts water containing 2.25 parts cationic surfactant (Arosurf AA-60) and 0.25 parts hydroxyethyl cellulose as a stabilizer and thickening agent. The pH of the medium was adjusted with HCl to 3.0. The emulsion was formed by adding 65% of the blend and 35% emulsification medium to yield a final emulsion of 65% solids.

The emulsion was prepared in a colloid mill to which the asphalt component and the aqueous emulsion medium were added simultaneously, but at different rates. The asphalt was added at a temperature of about 285° F. and the emulsion medium was added at a temperature of about 106° F. The emulsion was formed at about 200° to about 205° F., and was collected through a heat exchanger (Texas Division, Tranter, Inc., Supercharger Model S-3-HJ-10). A final emulsion temperature of 130° F. yielded an emulsion which had a viscosity of about 6000 to about 6500 cps after 3 days' storage.

EXAMPLE IV

Preparation of Asphalt-Elastomer Blend Emulsion

An emulsion was prepared as set forth in Example III, but with 1.25 parts of a 2% aqueous solution of Cyanomer P-250 replacing all of the hydroxyethyl cellulose of the aqueous emulsification medium, and using an asphalt (DT4105, DT4044) which has a softening point of 108° F., a penetration value of 255, and viscosities of 2050 at 210° F., 625 at 245° F. and 175 at 285° F. Due to the characteristics of a specific blend or to the characteristics of the mill in which the emulsion is formed, the amount of Cyanomer P-250 may be increased, e.g., up to about 10% of the 2% aqueous solution may be required to obtain the desired viscosity.

The emulsions of Examples I and II were applied to an impervious substrate and cured to a film. The resultant films had the properties of Table I.

TABLE I

| Example # | Tensile Strength[1] (psi) | Elongation[2] (%) | Low Temperature Flex[3] °F. |
|---|---|---|---|
| I (Control) | 10–24 | 1200–1400 | −5 |
| II | 24.8 | 1127 | −5 |
| III (Control) | 6.9 | 1200 | 5–10 |

TABLE I-continued

| Example # | Tensile Strength[1] (psi) | Elongation[2] (%) | Low Temperature Flex[3] °F. |
|---|---|---|---|
| IV | 22.0 | 1123 | −5 |

[1]ASTM Test D412
[2]ASTM Test D412
[3]Sample conditioned at indicated temperature and bend around 1-inch mandrel. Adapted from ASTM Test D2939.

The amount of acrylamide added affects the viscosity of the final emulsion, as shown in Table II, where the emulsion is that of Example II. The viscosities were determined by the use of a No. 2 spindle at 2.5 rpm with the sample at room temperature.

TABLE II

| Amount (%) of 2% Aqueous Solution of P-250 Added | Viscosity (cps) |
|---|---|
| 0 | 400 |
| 1.0 | 7,800 |
| 1.25 | 10,176 |
| 1.47 | 13,840 |

The collection temperature, i.e., the final emulsion temperature after the emulsion has passed through the heat exchanger, affects the final viscosity of the emulsion at room temperature and upon storage.

The emulsion was similar to that of Example II, using an emulsification medium of 100 parts water, 2.25 parts AA-60 surfactant and 0.9 parts of a 2% solution of P-250.

The effect of collection temperature is illustrated in Table III.

TABLE III

| SAMPLE | 1 | 2 | 3 | 4 | 5 | 6 | 7 | 8 |
|---|---|---|---|---|---|---|---|---|
| Collection Temp. (°F.) | 195–196 | 183–187 | 160–165 | 140–145 | 130–135 | 120–125 | 110–115 | 100–105 |
| Viscosity[1] (cps) Days | | | | | | | | |
| 1 | 18,240 | 17,880 | 12,720 | 9,380 | 7,820 | 6,720 | 6,880 | 6,780 |
| 6 | 18,520 | 17,600 | 14,400 | 11,520 | 9,980 | 8,520 | 8,780 | 9,000 |
| 9 | 18,320 | 18,540 | 15,320 | 12,480 | 10,600 | 9,440 | 9,560 | 9,700 |
| 14 | 18,200 | 17,100 | 15,460 | 13,540 | 11,960 | 10,440 | 10,780 | 10,740 |
| 20 | 16,800 | 17,880 | 16,060 | 13,460 | 12,640 | 11,120 | 11,280 | 11,820 |

[1]Viscosity measured by Brookfield RVT, No. 3 spindle at 5 rpm for 5 minutes at room temperature.

It will be noted that there is no appreciable viscosity difference in collection at temperatures of from about 100° F. to about 125° F. Since a final desired spray viscosity is about 6,000 cps to about 12,000 cps, a collection temperature of less than about 125° F. is desired for the emulsion of Example II.

The emulsions of Example IV has slightly differing collection temperature characteristics, and it is preferred that it be collected at temperatures of from about 120° F. to about 140° F.

For an emulsion of Example IV containing 1.50% of a 2% aqueous solution of P-250 and collected at 135° F., the viscosity was 4,300 cps after 1 day, 5,200 after 2 days, 6,500 after 8 days, 6,600 after 13 days and 6,300 after 22 days.

The crack bridging capabilities of Examples I and II were compared by ASTM test C 836-84. In this test, 2"×2" steel blocks were placed in abutment and one surface was coated with the emulsion to a depth of about 60 mils. The coated blocks were cured for 14 days at 23° C. and 50% relative humidity. Prior to the test, the coated blocks were cooled to the test temperature.

The results are presented in Table IV. The blocks were pulled apart in an Instron machine at the indicated temperature and at a rate of ⅛ inch per hour until the space between them was ½ inch, the space was then closed at the same rate. This cycle was repeated 10 times or until failure of the membrane. The notation "Passed" indicates no cracks after 10 cycles. The notation "Failed" means failure of the membrane prior to the completion of 10 cycles.

TABLE IV

| Example No. | Test Temperature (°F.) | Condition After Ten Cycles |
| --- | --- | --- |
| I | 20 | Passed |
|  | 10 | Passed |
|  | 0 | Failed |
| II | 10 | Passed |
|  | 0 | Passed |
|  | 0 | Passed |
|  | −5 | Failed |
|  | −10 | Failed on First Cycle |

Thermatron testing to determine drying characteristics of the reformulated product was done at two extreme conditions—high temperature/high humidity (95° F./85%) and low temperature/high humidity (50° F./80%). The test procedure consisted of preparing standard samples by filling ½-inch wide by ½-inch deep by 7-inches long simulated cracks in cement blocks with the materials to be tested. Samples of the emulsion of Example II were run along with samples of the emulsion of Example III. The samples were exposed to the conditions for 24 hours, at which time they were removed and dissected. Signs of brown, liquid, uncured emulsion were reported. Full cure is defined as no liquid emulsion present. The results are summarized in Table V.

TABLE V

| Example | Conditions | Results |
| --- | --- | --- |
| II | 95° F./85% humidity, 24 hours | No sign of visible brown emulsion, full cure |
| I | 95° F./85% humidity, 24 hours | Thin skin (approximately 30 mil) full depth of brown emulsion beneath skin |
| II | 50° F./80% humidity, 24 hours | No sign of visible brown emulsion, full cure |
| I | 50° F./80% humidity, 24 hours | Thin skin (approximately 60 mil) full depth of brown emulsion beneath skin |

To illustrate the use of the blended emulsion of Example IV as a sprayed-on coating for an exterior building wall, such as a basement wall, a simulated vertical wall was constructed of five sheets of drywall board nailed on a wood frame. The emulsion tested was from another batch of the composition of Example IV. A 31-mil spray nozzle was used with 2500 psi pressure to form an 18-inch spray pattern. The spraying was done outside at an air temperature of 45° F., and the sprayed coating cured completely overnight under adverse conditions of a temperature of about 20° F. and rain. The coating thickness was 16 mils, and the coating tensile strength was 21.8 psi, the elongation was 1113 percent, and the low temperature flexural value was −5 to −9° F.

We claim:

1. An emulsion of a chemically modified asphalt or a blend of asphalt with a radial block copolymer of butadiene and styrene, comprising said asphalt, water, a surfactant, and an acrylamide homopolymer, said acrylamide homopolymer being present in an amount effective to increase the curing rate of said emulsion and prevent skin-over, said chemically modified asphalt being the reaction product of asphalt, a vinyl monomer, one or more elastomers, and an acrylamide and wherein the acrylamide homopolymer has a molecular weight of approximately 5,000,000 to 6,000,000.

2. An aqueous emulsion comprising an asphaltic phase of asphalt reacted with styrene, an acrylamide and natural rubber or an elastomer, and an aqueous phase of water, surfactant, and an acrylamide homopolymer having a molecular weight of approximately 5,000,000 to 6,000,000, said acrylamide homopolymer being present in an amount to improve the tensile strength of a film formed of said asphaltic phase as compared to the film formed from an aqueous asphaltic emulsion containing no acrylamide homopolymer but containing hydroxy ethyl cellulose instead, and said amount of acrylamide homopolymer also effective to provide an increase in curing rate of said emulsion compared to an aqueous asphaltic emulsion containing no acrylamide homopolymer but containing hydroxyethyl cellulose instead.

3. An aqueous emulsion comprising a blend of asphalt with a radial block copolymer of styrene and butadiene emulsified in an aqueous emulsification medium of water, surfactant and an acrylamide homopolymer having a molecular weight of approximately 5,000,000 to 6,000,000, said acrylamide homopolymer being present in an amount to improve the tensile strength of a film formed of said asphaltic phase as compared to the film formed from an aqueous asphaltic emulsion containing no acrylamide homopolymer but containing hydroxy ethyl cellulose instead, and said amount of acrylamide homopolymer also effective to provide an increase in curing rate of said emulsion compared to an aqueous asphaltic emulsion containing no acrylamide homopolymer but containing hydroxyethyl cellulose instead.

4. The method of improving the curing rate of a rubber-modified asphalt emulsion in an aqueous medium by incorporating into the aqueous medium either before or after emulsification, an acrylamide homopolymer having a molecular weight of from about 5,000,000 to about 6,000,000.

5. The method of making a stable, rapidly curing emulsion of an asphalt-elastomer blend comprising the steps of forming a blend of from about 88% to about 94% by weight asphalt and from about 6 to about 12% by weight of a radial block copolymer of styrene and butadiene, and emulsifying the blend in an aqueous medium containing water, a surfactant and from about 0.005% to about 0.10% acrylamide homopolymer having a molecular weight of approximately 5,000,000 to 6,000,000.

6. The method of claim 4, wherein the rubber-modified asphalt is the reaction product of asphalt, an acrylamide, styrene and natural rubber or an elastomer.

7. The method of claim 4, wherein the rubber-modified asphalt is a blend of from about 88 to about 94% by weight of asphalt and from about 6% to about 12% by weight of a radial block copolymer of styrene and butadiene.

8. An aqueous emulsion comprising an asphaltic phase selected from the group consisting of (a) asphalt reacted with styrene, an acrylamide and natural rubber or an elastomer, and (b) a blend of asphalt with a radial teleblock copolymer of styrene and butadiene, said emulsion further including an aqueous phase of water, a surfactant and from about 0.005% to about 0.2% by weight of a high molecular weight acrylamide polymer, said emulsion being characterized by higher drying rates and the lack of film skin-over and the residue of said emulsion having higher tensile strength than a reference emulsion wherein the reference emulsion contains hydroxyethyl cellulose and wherein the reference emulsion is substantially free of said acrylamide polymer, the molecular weight of said acrylamide polymer being approximately 5,000,000 to 6,000,000.

* * * * *